United States Patent [19]
Belokin et al.

[11] Patent Number: 5,711,501
[45] Date of Patent: *Jan. 27, 1998

[54] SUCTION CUP ATTACHMENT ASSEMBLY

[76] Inventors: Paul Belokin; Martin P. Belokin, both of 7801 I-35 North, Denton, Tex. 76202; Norman P. Belokin, 3341 Evers Pkwy., Denton, Tex. 76207

[*] Notice: The term of this patent shall not extend beyond the expiration date of Pat. No. 5,381,900.

[21] Appl. No.: 744,467

[22] Filed: Nov. 7, 1996

Related U.S. Application Data

[60] Division of Ser. No. 572,655, Dec. 14, 1995, Pat. No. 5,381,900, which is a continuation-in-part of Ser. No. 510,814, Aug. 3, 1995, abandoned.

[51] Int. Cl.⁶ .................................................. F16B 47/00
[52] U.S. Cl. .................................. 248/205.9; 248/205.5
[58] Field of Search .......................... 248/205.5, 205.8, 248/205.9, 362, 363

[56] References Cited

U.S. PATENT DOCUMENTS

| | | | |
|---|---|---|---|
| 3,059,952 | 10/1962 | Wittman et al. | 248/205.9 X |
| 3,649,069 | 3/1972 | Zip | 248/305.9 X |
| 3,863,568 | 2/1975 | Frederick | 248/205.8 |
| 4,607,875 | 8/1986 | McGirr | 248/205.9 X |
| 5,263,760 | 11/1993 | Sohol | 248/205.9 X |
| 5,381,990 | 1/1995 | Belokin et al. | 248/205.9 |
| 5,511,752 | 4/1996 | Tretheway | 248/205.9 |

*Primary Examiner*—Derek J. Berger
*Attorney, Agent, or Firm*—Jack A. Kanz

[57] ABSTRACT

Releasable suction cup assemblies for use in supporting objects on smooth surfaces are formed by a cup body which has a neck with a bore passing therethrough and a valve for selectively opening and closing the bore. The valve extends through the bore and has a retainer on one end which moves the valve into a sealing position to secure the cup to the smooth surface and deformably wedges the neck against the object to secure the object to the suction cup. The vacuum of the suction cup can be released for repositioning the cup.

17 Claims, 3 Drawing Sheets

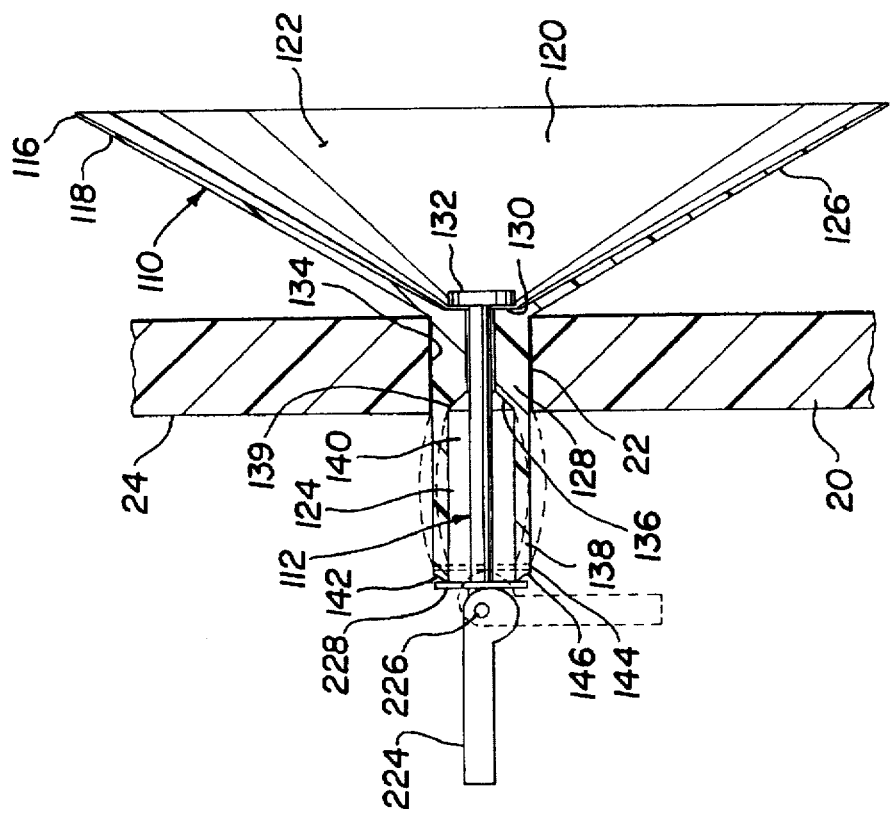
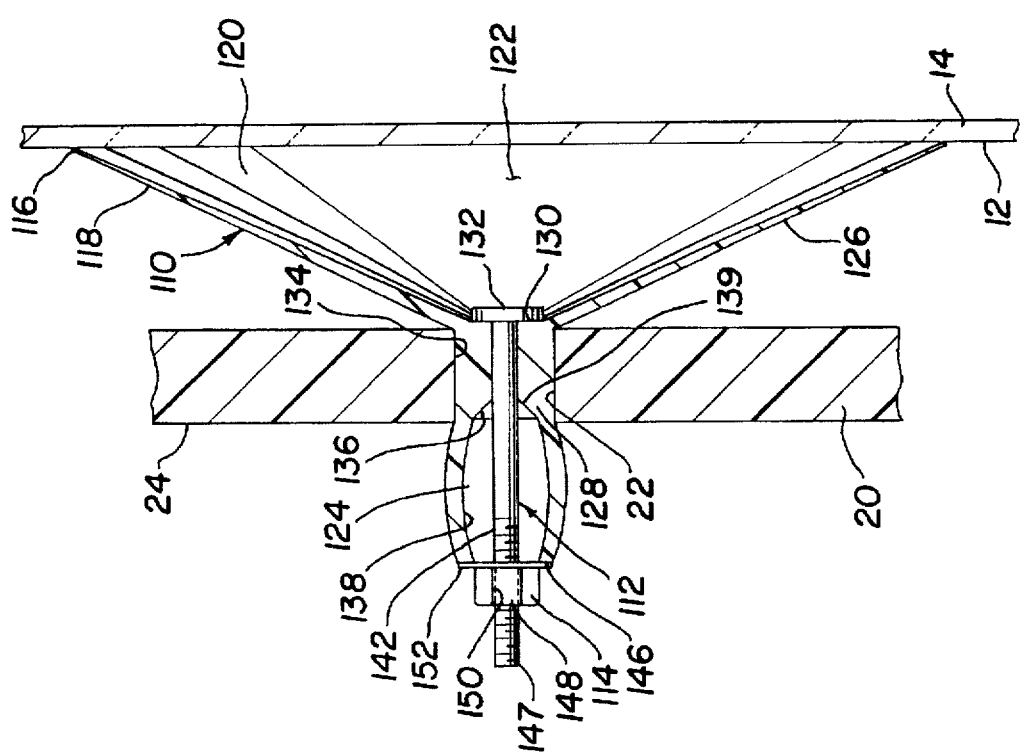

SUCTION CUP ATTACHMENT ASSEMBLY

This is a division of application Ser. No. 08/572,655 filed Dec. 14, 1995, now U.S. Pat. No. 5,381,900, entitled Suction Cup Attachment Assembly which is a continuation-in-part of application Ser. No. 08/510,814 filed Aug. 3, 1995 entitled Suction Cup Attachment Assembly, now abandoned.

This invention relates to relocatable suction cup assemblies and to methods of mounting objects to surfaces using such assemblies. More particularly, it relates to suction cup assemblies using a valve to control cup sealing to a flat surface so that the suction cups can be positioned, relocated and removed with ease.

BACKGROUND OF THE INVENTION

Suction cups are commonly used to mount and secure objects to smooth surfaces such as the surfaces of glass, plastic, Formica®, glazed tile, metal, etc. The typical suction cup includes a cup body and a stem. The cup body is generally arcuate or circular and defines a concavity. Typically the stem is integrally formed on the body and used as the place of attachment for the object to be supported by the suction cup. At least the body of the suction cup is made of rubber, plastic or other material having sufficiently resilient properties so that when the body is pressed against a smooth surface the volume of concavity is reduced and air or other fluid is expelled so that the body forms a tight seal against the smooth surface. Atmospheric pressure outside the body retains the suction cup body against the surface. When the seal is broken, fluids such as air or the like rush into the concavity, releasing the suction attachment to the surface and the resilient material of the suction cup body returns to its relaxed condition. The suction cup can be repeatedly used.

Problems often arise in use of suction cups because they are difficult to properly position. Once a suction cup is attached to a surface, suction forces (atmospheric and frictional) resist repositioning of the cup. Additionally, attachment of the suction cup to a surface can be a problem due to the inherent structural weakness of the surface. For example, a conventional suction cup applied to a standard pane of glass could break the pane when removed without first relieving the vacuum within the cup. An example of a device used to overcome this problem is found in U.S. Pat. No. 5,381,990 to Paul Belokin. This patent discloses a suction cup having a cup body with a duct passing therethrough and a valve element on a stem for selectively opening the duct. A retainer is tightened on the stem to draw a head of the stem and a flange toward each other while also engaging the retainer against the object to be mounted.

Prior devices, however, do not provide a deformable means to wedge the suction cup body against the object to secure the object to the suction cup. Such a structure acts to reduce wear on the object and the cup body, thus extending the useful commercial life of the unit. Conventional devices typically require a retainer capable of establishing frictional relation with the object using a nut or the like torsionally imposed against the object or a series of ridges on the cup body to engage an aperture in the object to station the suction cup body to the object. With repeated use and replacement with different objects, the suction cup and the object are subjected to abrasive use which diminishes the effectiveness of the cup and the promotional attractiveness of the object.

SUMMARY OF THE INVENTION

In accordance with the present invention a cup body defining a bore extending through a radially deformable neck is provided with a retainer and a valve contained in the bore. The cup body has an outer surface defining a radially deformable neck and a deformable arcuate flange with a concave inner surface. The bore extends from the outer surface through the neck to the concave inner surface of the cup body. The neck is deformable substantially outwardly to form a general wedge or bulge in the presence of axial force against the neck.

The valve has a valve surface and a stem portion which selectively engages the end of the bore to seal the concave inner surface of the cup body. Once sealed, a vacuum is effected when the cup body is placed against a supporting surface. When the valve surface is not in sealing relation with the bore, fluids may pass between the inner and outer surfaces of the cup through the bore. A retainer on the stem exerts axial force relative to the radially deformable neck and places the valve surface in sealing relationship with the bore. Other features and advantages of the invention will become more readily understood from the following detailed description taken in connection with the appended claims and attached drawing in which:

BRIEF DESCRIPTION OF THE DRAWING

FIG. 3 is a sectional view taken along line 2—2 of FIG. 1 showing the suction cup in an attached position;

FIG. 4 is a sectional view taken along line 2—2 of FIG. 1 showing the suction cup implementing a lever retainer.

DESCRIPTION OF THE PREFERRED EMBODIMENTS

Figure 2:
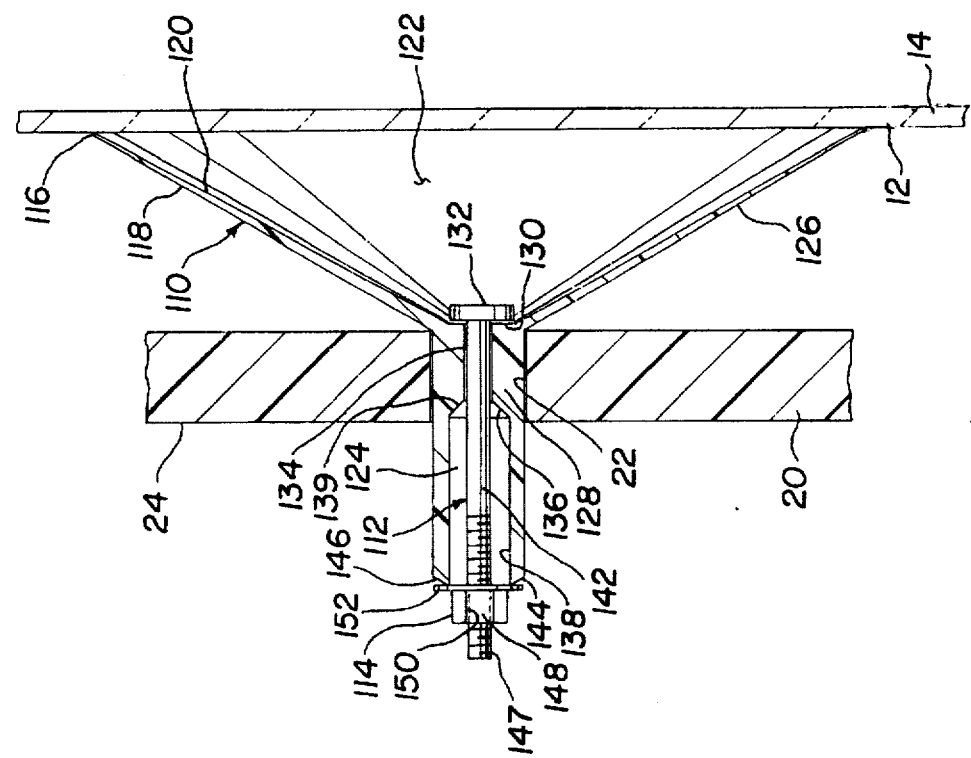
FIG. 2 is a sectional view taken along line 2—2 of FIG. 1 showing the suction cup in released condition.

The invention may take various forms and is suitable for use in a wide variety of assembly operations. The drawing is only illustrative of preferred examples of the invention and is not to be construed as limiting the invention. Presently preferred embodiments are described herein by referring to apparatus and methods showing various examples of how the invention can be made and used. Like reference numerals are used throughout the description and the several views of the drawing to indicate like or corresponding parts.

Figure 1:
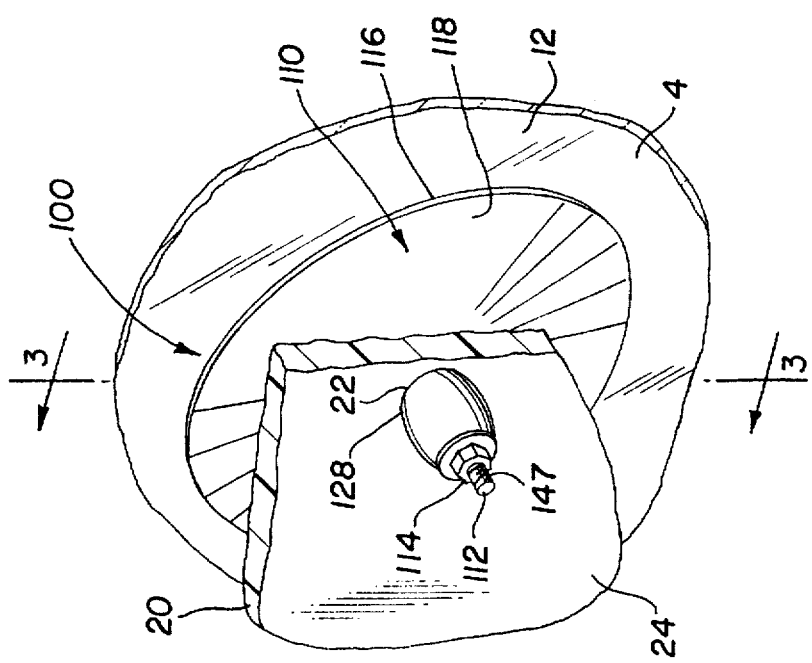
FIG. 1 is a perspective view of one embodiment of a suction cup assembly employing the invention.

As illustrated in FIG. 1, the invention comprises a suction cup assembly 100 attached to an object 20 to be supported on wall 4 or the like. The suction cup assembly 100 generally comprises a suction cup body 110, a valve stem 112 and a retainer 114.

The structure and operation of the suction cup assembly 100 is illustrated in FIGS. 2 and 3. The cup body is generally cup-shaped and has a peripheral edge 116, outer surface 118 and an inner surface 120 which defines a concavity. The peripheral edge 116 is preferably circular as shown in FIG. 1. Nevertheless, it is to be understood that the suction cup body 110 could have other generally cup-like shapes. The cup body 110 is preferably made of resilient material which allows the cup body 110 to deform by flattening to reduce the volume of a cup chamber 122. Many resilient materials such as rubber and soft plastics are suitable.

The cup body 110 has a tapered cross-section 126 with its narrowest end generally coinciding with the peripheral edge 116 and its broadest end joining the neck 128. The neck preferably conforms to the shape of aperture 22 in the object 20. For example, if the aperture is circular, the neck 128 is preferably cylindrical to conform thereto, the outer circumference of the neck 128 being smaller than the inner diameter of the aperture 22.

An end surface 130 of the neck 128 is exposed to the chamber 122. The end surface is shaped to sealingly engage a stem head or valve surface 132 mounted on an end of a valve stem 112. A stem bore 124 is defined within the neck 128. Stem bore 124 has a first portion 134 and a second portion 138 having a larger diameter than the first portion interconnected by a transitional portion 139. The first portion 134 of the bore closes about the stem 112 and has a length sufficient to substantially limit the stem 112 to unidirectional and rotational movement. The first portion 134 extends from the end surface 130 to the transitional portion 139 which generally comprises a shoulder 136. As illustrated in FIGS. 2 and 3, the shoulder 136 has an angular cross-sectional slope which resembles a cone, but may also be curved. The transitional portion 139 extends to the second potion 138 which has a larger diameter than the first potion 134. When the stem is inserted into the aperture 22 in object 20, the first portion 134 extends from the shoulder to the end surface 130 in the chamber 122, creating a fulcrum or base region within the aperture 22 of the object 20 sufficient to allow the second portion 138 to be flared or thickened outwardly when exposed to axial compressive force. When flared or thickened, the second portion 138 wedges against the object 20 to secure the object 20 to the suction cup body 110. A tip 14 of the neck 128 has a beveled outer edge 146 to lessen the initial spreading forces in the neck 128 when retainer 114 initially engages the tip 144. The neck may thus be more readily flared or thickened. The transitional portion 139 may extend from beneath the plane of the object surface 24 to the second portion 138 in a more gradual slope and achieve the same effect using a conical cross-section while keeping the fulcrum within the aperture 22 of the object 20.

The stem 112 has a head or valve surface 132 and a shaft 142. The stem 112 is removable and formed of a substantially rigid material such as a hard-cured plastic, steel or the like. The head 132 is configured to fit against the end surface 130 in sealing relation sufficient to seal the chamber 122 from the bore 124 and prevent flow of air or other fluids. The end opposite the stem head 132 may have a threaded potion 147 which extends through the bore 124 to allow retainer 114 to be threaded onto the stem 112. The end surface 130 may have a depression or other such annular surface to encourage a greater sealing relation between the head 132 and the neck 128.

The retainer 114 has a central portion 148 and an outer surface shaped to accept a tightening device such as a wrench, screw driver or the like. The central portion 148 has a threaded bore 150 adapted for threading onto the threaded portion 147. As shown in FIG. 3, the retainer 114 also has a flanged base 152 with a diameter at least as large as the outer diameter of the neck 128. Referring to FIG. 4, the retainer 114 may be in the form of a lever device 224 secured to the end of the stem 112 through an aperture therethrough and corresponding pin 226. Thus, when the lever 224 is engaged (as shown in phantom lines) compressive axial force is applied against a planar body 228 positioned between the neck 128 and the lever device 224. A suitable planar body is a washer having a diameter sufficient to accept the stem 112. The compressive axial force applied to the stem head 132 seals the bore 124 of the neck 128 while flaring or thickening the neck 128. In either case, the retainer 114 does not extend past the circumference of the neck 128 when the neck is in a relaxed state. This allows ready exchange of the object 20 with another by sliding the object 20 over and past the neck 128.

As illustrated in FIGS. 2 and 3, the threaded portion 147 of the stem 112 is positioned through bore 124 in the suction cup body 110 such that the head 132 of the stem 112 is positioned over the first portion 134. The neck is positioned through the object aperture 22 to be attached so that the concavity of the suction cup body 110 faces surface 12. Retainer 114 is threaded onto the threaded portion 146 of the stem 112 on the opposite side of the object 20. A plurality of suction cup assemblies 100 can be positioned on an appropriately shaped object 20 in a similar manner. The retainer 114 is not tightened so as to permit fluid flow through the bore 124.

To secure the object 20 to the smooth surface 12 of the glass 14, the object 20 is positioned adjacent the surface 12 as desired. Until the retainer 114 is tightened, the chamber 122 defined by the inner surface 120 of the suction cup body 110 can be moved along the surface 12 and repositioned as desired.

When the object 20 is positioned substantially as desired, a retainer 114 on one of the suction cup assemblies 100 is tightened. As the retainer 114 is tightened on the threaded portion 147 of the stem 112, the head 132 of the stem 112 and the tip 144 of the neck are dram toward each other. The tip 144 is flared outwardly to deform the neck into a substantially conical wedge or deformably thickened portion to form a structure which prevents the object 20 from disengaging the suction cup assembly 100.

The upper surface on the head 132 compresses the end surface 130 of the neck 128 to seal the bore 124, thereby preventing air or other fluids from communicating between the chamber 122 and the outer atmosphere through the bore 124. When the suction cup assembly 100 is pressed against the surface 12, the fluid within is expelled past the peripheral edge 116. The deformable cup body 110 conforms to the smooth surface 12, forming a tight seal. Atmospheric pressure acting on the outer surface 118 of the cup body retains the suction cup against the smooth surface 12. If object 20 is not mounted in the desired position, or if it becomes desirable to change the position of the suction cup, the retainer 114 may be successively loosened to decompress the chamber 122 and break the vacuum seal of the suction cup body 110. The object 20 can then be easily repositioned as desired. Furthermore, if it is desired to replace the object 20 with another, then the retainer 114 is simply disengaged, allowing the installed object 20 to slide over the neck 128 and the retainer 114. Another object can then be slid over the neck 128 and the retainer 114.

Figure 5:
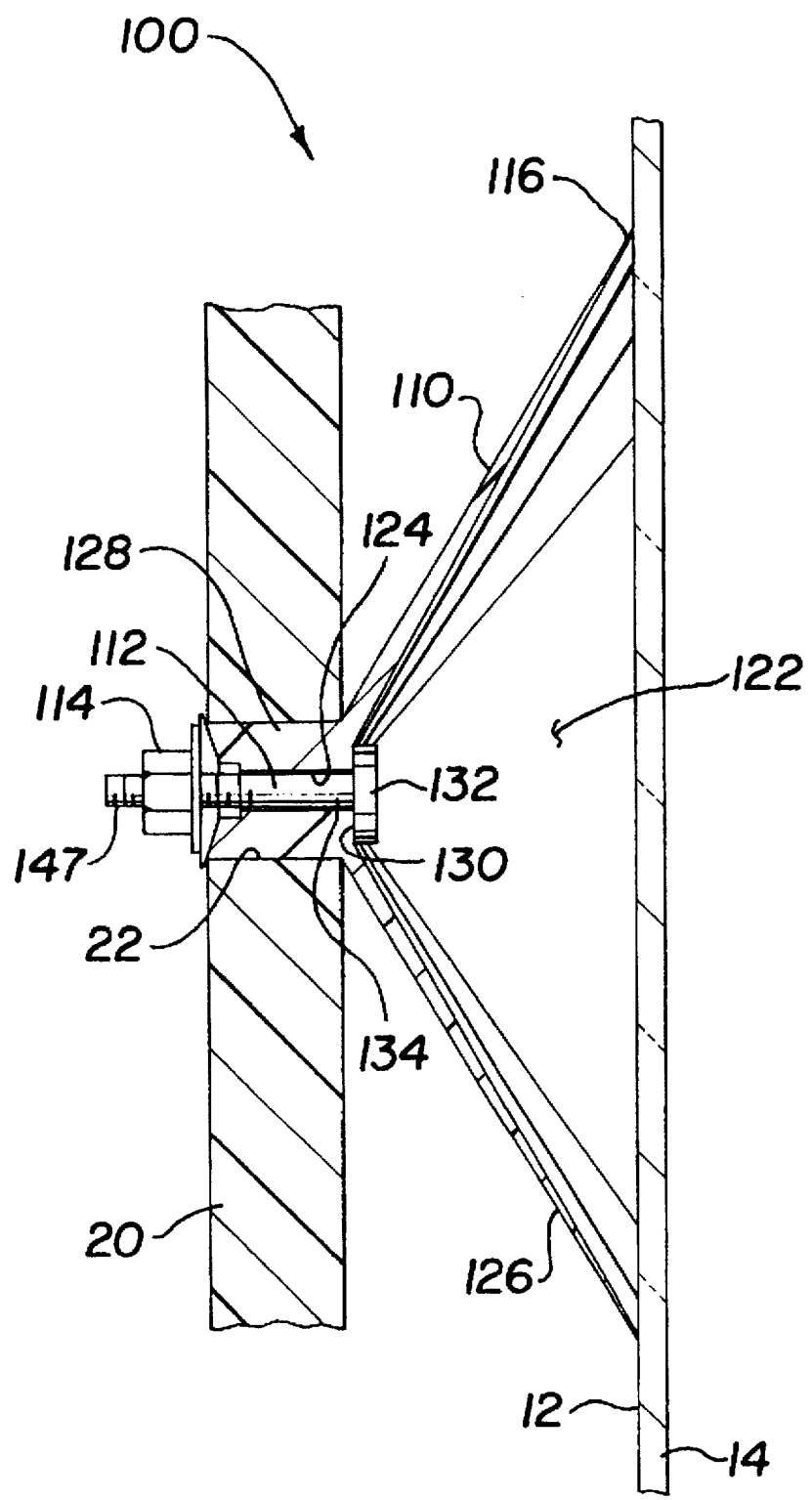
FIG. 5 is a sectional view of the another embodiment of the present invention.

FIG. 5 illustrates yet another embodiment of the present invention. The neck 128 can extend slightly beyond the aperture 22 of the object 20 to be supported. The threaded portion 147 of the stem 112 is positioned through bore 124 in the suction cup body 110 such that the head 132 of the stem 112 is positioned over the first portion 134. The neck is positioned through the object aperture 22 so that the concavity of the suction cup body 110 faces surface 12. Retainer 114 is threaded onto the threaded portion 147 of the stem 112 on the opposite side of the object 20. A plurality of suction cup assemblies 100 can be positioned on an appropriately shaped object 20 in a similar manner. The retainer 114 is not tightened so as to permit fluid flow through the bore 124.

To secure the object 20 to the smooth surface 12 of the glass 14, the object 20 is positioned adjacent the surface 12 as desired. Until the retainer 114 is tightened, the chamber 122 defined by the inner surface 120 of the suction cup body 110 can be moved along the surface 12 and repositioned as desired.

When the object 20 is positioned substantially as desired, a retainer 114 on one of the suction cup assemblies 100 is tightened. The upper surface on the head 132 compresses the end surface 130 of the neck 128 to seal the bore 124, thereby preventing air or other fluids from communicating between the chamber 122 and the outer atmosphere through the bore 124. When the suction cup assembly 100 is pressed against the surface 12, the fluid within is expelled past the peripheral edge 116. The deformable cup body 110 conforms to the smooth surface 12, forming a tight seal. Again, atmospheric pressure acting on the outer surface 118 of the cup body retains the suction cup against the smooth surface 12. When the retainer 114 is tightened, it forces the neck 128 to thicken outwardly creating a radial compressive force against the object 20, securing the object 20 to the suction cup body 110. Further, the portion of the neck 128 which extends beyond the aperature 122 can be flattened so as to have a radius greater than the radius of the aperature.

If object 20 is not mounted in the desired position, or if it becomes desirable to change the position of the suction cup, the retainer 114 may be successively loosened to decompress the chamber 122 and break the vacuum seal of the suction cup body 110. The object 20 can then be easily repositioned as desired. Furthermore, if it is desired to replace the object 20 with another, then the retainer 114 is simply disengaged, allowing the installed object 20 to slide over the neck 128 and the retainer 114. Another object can then be slid over the neck 128 and the retainer 114.

Although the invention has been described with particular reference to specific suction cup assemblies, the forms of the invention illustrated are to be taken as illustrative of the principles thereof. Accordingly, it is to be understood that the forms of the invention shown and described in detail are to be considered examples only and that various changes, modifications and rearrangements may be resorted to without departing from the spirit and scope of the invention as defined by the appended claims.

What is claimed:

1. A suction cup assembly comprising:
    (a) a cup body having a radially deformable neck, a deformable arcuate flange with a concave inner surface, and a bore extending through the neck to the concave inner surface of said cup body;
    (b) a valve having a valve surface and a stem portion which extends through the bore; and
    (c) a retainer on the stem portion which exerts axial force on the radially deformable neck to selectively urge the valve surface of said valve in sealing relation with the concave inner surface around the bore and deform the neck radially.

2. A suction cup assembly as defined in claim 1 wherein said retainer does not extend radially past the circumference of the neck of said cup body when said retainer is not urging the valve surface of said valve in a sealing relation with the concave inner surface around the bore.

3. A suction cup assembly as defined in claim 2 wherein the stem portion of said valve is threaded and said retainer is a threaded connector.

4. A suction cup assembly as defined in claim 3 wherein the neck of said cup body has an outer annular surface surrounding said bore and said retainer has an opposed annular surface whereby said threaded stem portion can be positioned through an aperture in an object to be mounted adjacent a support surface with an annular area of said object adjacent the aperture clamped between said outer annular surface of said cup body and the radially deformable neck.

5. A suction cup assembly as defined in claim 2 wherein said retainer is a lever attached to said stem portion which imparts axial force against the neck by acting against a planar body positioned therebetween.

6. A suction cup assembly as defined in claim 1 wherein the bore of said cup body has a first portion, a second portion and a transitional portion between said first and said second portions, said first portion having a uniform diameter less than a uniform diameter of said second portion to fictionally embrace the stem portion of said valve.

7. A suction cup assembly as defined in claim 1 wherein the bore of said cup body has a conical portion.

8. A suction cup assembly as defined in claim 1 wherein said deformable neck may be positioned through an aperture in an object to be mounted such that when said retainer is tightened on said threaded stem, said deformable neck creates a compressive force against said object.

9. A suction cup assembly comprising:
    (a) a concave cup body having an inner surface and an outer surface and a bore extending therethrough, said cup body having a neck which is radially deformable when exposed to an axial force;
    (b) an elongated valve extending through the bore and having an enlarged end portion on one end thereof with a cross-section larger than the cross-section of the bore defined within said concave cup body adjacent the inner surface; and
    (c) a retainer mounted on another end of said valve for exerting axial force on said neck.

10. A suction cup assembly as defined in claim 9 wherein said retainer releasably applies axial force to a stem of said valve to releasably force said enlarged end portion against the inner suffice around an elongated opening of the bore into a sealing relationship when radially deforming the neck of said cup body.

11. A suction cup assembly as defined in claim 10 wherein said retainer does not extend radially beyond the circumference of the neck of said cup body when the retainer is not forcing the enlarged end portion against the inner surface around the opening of the bore.

12. A suction cup assembly as defined in claim 10 wherein said elongated valve is threaded on another end and said retainer is a threaded connector.

13. A suction cup assembly as defined in claim 10 wherein said cup body has an annular seat formed on said inner surface around the opening of the bore.

14. A suction cup assembly as defined in claim 9 wherein said deformable neck can be positioned through an aperture in an object to be mounted such that when said retainer is tightened on a threaded stem of said elongated valve, said deformable neck creates a compressive force against said object.

15. A support assembly comprising:
    (a) an object having at least one mounting aperture therein;
    (b) a cup body having an outer surface defining a radially deformable neck sized and shaped to fit through the aperture of said object when not deformed and a deformable flange with a concave inner surface, a bore extending through the neck to a concave inner surface of said cup body and a valve seat positioned in the concave inner surface surrounding said bore;

(c) an elongated valve having a generally tapered plug portion adapted to be contained in the bore of said cup body; and (d) retaining means for exerting axial force along the length of said valve to deform the neck radially outwardly against said object to seal the concave inner surface against the valve seat.

16. A support assembly as defined in claim 15 wherein said elongated valve is threaded on an end and said retainer is a threaded connector.

17. A support assembly as defined in claim 16 wherein said cup body has an annular seat formed on said concave inner surface surrounding an opening of said bore.

* * * * *